Aug. 28, 1962 L. W. HIRSCH 3,051,023
AUTOMATIC DRILL WITH SENSING HEAD
Filed Sept. 15, 1960
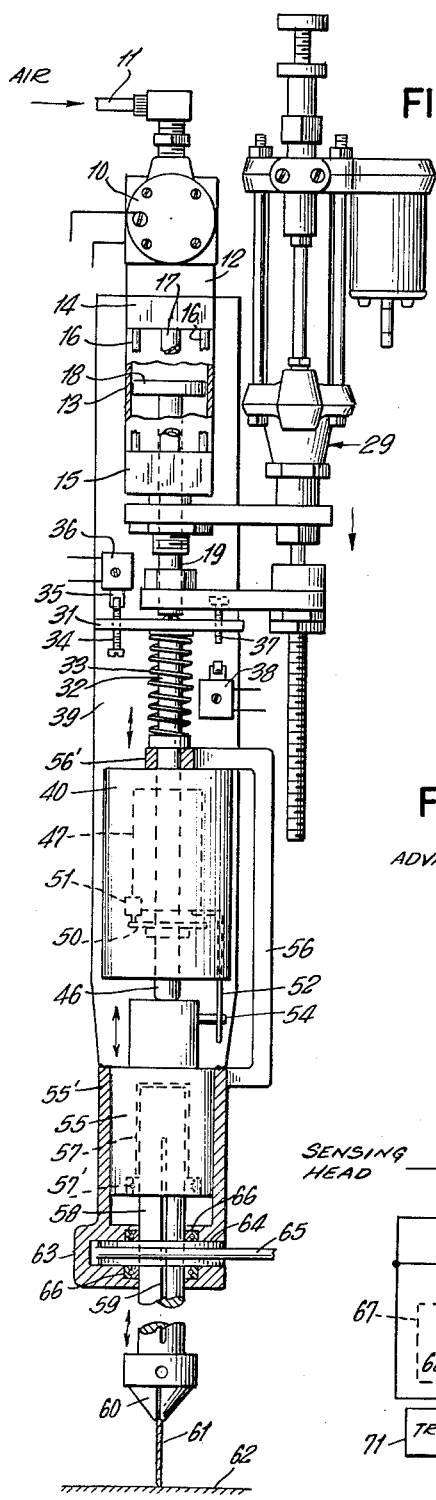
FIG. 1
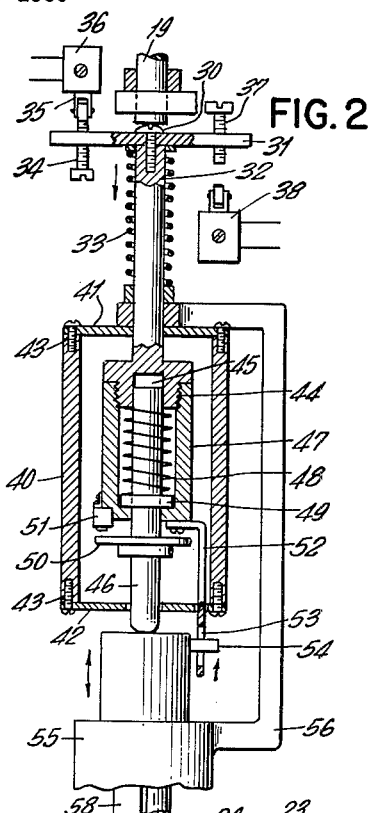
FIG. 2
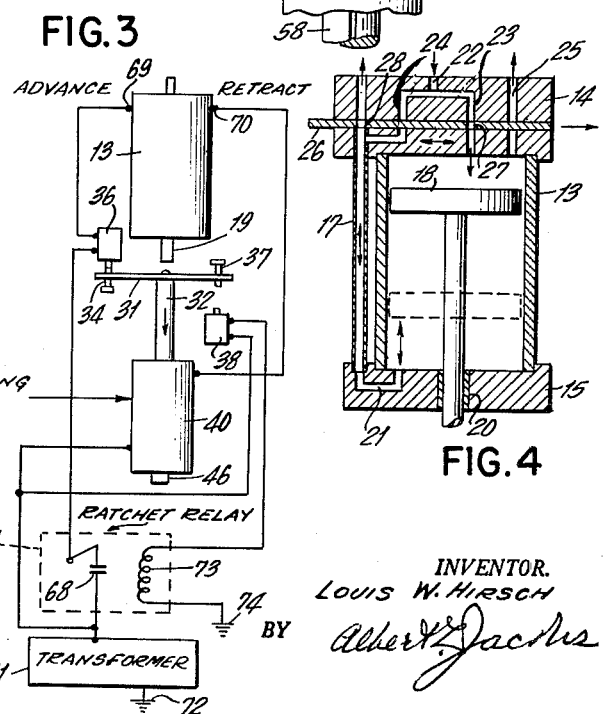
FIG. 3
FIG. 4
INVENTOR.
LOUIS W. HIRSCH
BY Albert V. Jacobs
ATTORNEY.

United States Patent Office 3,051,023
Patented Aug. 28, 1962

3,051,023
AUTOMATIC DRILL WITH SENSING HEAD
Louis W. Hirsch, 2385 Jerome Ave., New York 38, N.Y.
Filed Sept. 15, 1960, Ser. No. 56,308
4 Claims. (Cl. 77—32.4)

This invention relates to automatic drills for drilling small deep holes or holes of predetermined depth and more particularly to a sensing head for such drills providing accurate and precise control over the drilling operation, and a method of carrying out such drilling involving sensing by axial thrust.

Automatic drills are well known and widely used in a variety of drilling operations either to drill holes through various materials or to drill holes of predetermined depth in such materials. Prior drills, however, require a great deal of care from the operator as well as manual operations and measuring operations and so far as I am aware, no automatic drill for small holes has heretofore been provided with a sensing device by means of which the entire drilling operations can be carried out automatically and with the desired accuracy, nor has there been any automatic drill for small holes which is responsive to and under the control of the thrust or axial resistance met by the drill during the drilling operation with the result that, under prior practice, the drilled workpiece is often spoiled or inaccurate, requiring discarding or redrilling.

It is an object of the present invention to provide an automatic drill with a sensing head or device responsive to the resistance met by the drill during the drilling operation and to actuate and control the drill thereby.

Another object of the invention is to provide an automatic drill with a specially designed sensing head or device integrated into the feed control of the drill, whereby the drill will advance and retract automatically and progressively until the drilling operation is complete and all without any manual attention of the operator.

Other and further objects and advantages will be understood and appreciated by those skilled in this art or will be apparent or pointed out hereinafter.

In the accompanying drawing:

FIG. 1 is a vertical elevation partly in section of an automatic drill provided with a sensing head according to the invention;

FIG. 2 is a fragmentary elevational view partly in section of the sensing head and its associated parts;

FIG. 3 is a schematic view of the active portions of the drill and showing the electrical circuitry; and FIG. 4 is a vertical sectional view partly in elevation of the pneumatic actuating portion of the drill.

Referring now to the drawing in detail, the numeral 10 designates a standard form of valve known as an "Electroaire" valve manufactured by The Bellows Co. and which is readily available. This valve 10 is provided with air inlet 11 and solenoids which actuate and control the operation of the valve. This valve is also mounted on a block 12 above a cylinder 13 which has a top head 14 and a bottom head 15 between which extend spaced tie rods 16, the numeral 17 indicating a return air pipe the nature and purpose of which will be described below.

In cylinder 13 there is a piston 18 having a stem 19 the lower end of which passes through bottom head 15 which is provided with a suitable bearing or bushing 20 around a central aperture. Bottom head 15 is also provided with an air passage 21 one end of which communicates with the interior of the cylinder below the piston and the other end of which communicates with the air return pipe 17 one end of which is suitably held in bottom head 15.

Top head 14 is provided with a central inlet pipe 22 which has a branch 23 constituting an inlet to the interior of the cylinder 13 above piston 18. There is also another branch 24 which extends first horizontally then vertically downwardly and then again horizontally into communication with return air pipe 17 the upper end of which latter extends through top head 14 into communication with the atmosphere.

Top head 14 is further provided with a passageway 25 extending entirely through the top head and communicating at one end with the interior of the cylinder 13 above piston 18 and at the other end with the atmosphere. Top head 14 is further provided with a valve slide 26 movable, under the control of the solenoids in the "Electroaire" valve, horizontally in either direction as indicated in FIG. 4 and this valve slide is provided with two openings therethrough designated by the numerals 27 and 28.

From FIG. 4 it will be observed that the valve slide is in such position that the passageways 23 and 28 are opened and the passageways 24 and 25 are closed by the slide. It will further be appreciated that when the slide is moved to the right in FIG. 4 the proper distance passageways 24 and 25 will be opened and passageways 23 and 28 will be closed.

In view of the arrangement just described, it will be understood that it is necessary that the distance between the vertical portion of passageway 23 and the passageway 28 be exactly equal to the distance between the vertical portion of passageway 24 and passageway 25. In this way accurate flow control of the air is obtained.

Reverting to FIG. 1, it will be seen that a hydraulic check or dashpot generally designated by the numeral 29 is provided for the usual purposes and since the construction and operation of such is per se well known it requires no description here.

The rod 19 of piston 18 extends into contact with the head of a screw 30, the threaded shank of which extends through plate 31 into the upper end of rod 32 which is encircled by a helical spring 33. Plate 31 is provided at one side with a setscrew 34 which directly or indirectly as through a yoke 35 by means of which and depending upon the position of plate 31 microswitch 36 is closed, this being in response, as will be described below, to the closing of a ratchet relay in the electrical circuitry.

At the other side of plate 31 there is another setscrew 37 which in similar manner is adapted to cause microswitch 38 to be closed or opened and control of which can be adjusted by changing the position of the screw 37, so that it makes contact with microswitch 38 sooner or later, this in turn being dependent upon the distance that the drill is to travel.

The sensing head or device is arranged on a back panel 39, as are the other members already described, and comprises a housing 40 which is hollow and closed at its top and bottom by end plates 41 and 42 suitably secured in position as by the fastening means shown at 43.

Each end plate has a central opening. Rod 32 passes down through the opening in end plate 41 and then expands in diameter and is provided with screw threads 44 and a counterbore 45 in which latter is disposed in spaced relationship one end of rod 46. This rod 46 extends down through the cavity of casing 47 the upper end of which is threadedly engaged with the screw threads 44 and that portion of rod 46 which is within casing 47 is encircled by a helical spring 48 which is weaker than helical spring 33.

A typical spring is a steel wire of 0.015 inch diameter coiled into a spring of ¼ inch diameter and having 12 turns per each inch of free length. One end of spring 48 abuts the lower face of the counterbore portion of rod 32 and the other end abuts a collar 49 on rod 46 at the lower end of casing 47. Rod 46 is also provided with a circular flange or plate 50 against which microswitch 51 is adapted to make contact. The lower face of casing 47 is also provided with a bracket 52 of inverted L-shape and which bracket extend down through an aperture provided for that purpose in end plate 42, the lowermost end of the bracket being provided with an elongated slot 53 which receives the pin 54 on the upper end of the drill head 55.

The lower end of rod 46 makes contact with the upper surface of the drill head 55 part of which is disposed in drill head housing 55'. The U-shaped bracket 56 connects the drill head housing with the rod 32 just above end plate 41, and has a bearing portion 56' around the rod. The drill housing 55' is stationary and a portion of the drill head is counterbored at 57 for the reception of the upper end of the drill 58 which is splined at 59 and the lower end of which drill is provided in the usual way with jaws 60 for gripping the drill element 61 which acts upon workpiece 62, to drill a small diameter hole therein, e.g., a hole of 0.012" diameter and which may, for example, be a block or piece of metal, metal alloy, carbon for commutator brushes, etc. The upper end of the drill is rotatable in counterbore 57 which has bearings 57' at its mouth.

The drill housing is also provided with an enlarged portion 63 having a cavity for the reception of a grooved pulley 64 rotated by belt 65 from an electric motor or other power source (not shown). Since the pulley 64 is interlocked with the spline 59 of drill 58, rotation imparted to pulley 64 turns drill spindle 58 in quill 55 correspondingly, suitable lubricating bearings 66 being provided in the enlarged portion 63 of the drill housing, as shown in FIG. 1. Drill spindle 58 is also movable vertically upwardly and downwardly as required during the drilling of the workpiece 62 and without interruption of the rotation of the drill.

The microswitches above referred to are of conventional construction and are usually provided with a yoke in which a roller contact member rotates but may be of any known type having quick "make" and "break" elements suitable for use in the present invention.

From FIG. 3, it will be observed that microswitches 36 and 38 are connected into circuitry which includes ratchet relay 67 having a manually closable switch 68 and "advance" and "retract" electrical connections 69 and 70, respectively, with cylinder 13. Electrical connections 69 and 70 are of the impulse type and are electrical valves which close only momentarily and then immediately re-open. These are per se well-known and hence require no detailed description. Since only low voltage current is needed, there is a transformer 71 electrically connected to the ratchet relay 67, the transformer being grounded as shown at 72. The ratchet relay also has a coil 73 grounded as shown at 74.

In operation, switch 68 is closed manually, there being a suitable switch button for this purpose mounted on any convenient part of the device or its frame, thereby energizing the ratchet relay. Current now flows to microswitch 36 and thence into the "advance" side of cylinder 13, there being, as above indicated, a momentary electrical impulse only. Cylinder 13 then begins the advance stroke, rod 19 descending under the influence of incoming air into the cylinder above piston 18 until plate 31 is caused to move downwardly, thus effecting a corresponding amount of drilling of the workpiece, the drill being rotated through the belt and pulley arrangement above described and which is running continuously. Meanwhile, springs 33 and 48 have become contracted, storing energy therein. The sensing head or device closes the circuit to the "retract" side of cylinder 13, again as a momentary impulse. The retraction closes microswitch 36 again and the cycle repeats until the hole is drilled through the workpiece or to a predetermined depth and when the drilling is completed screw 37 acts to close microswitch 38 which opens ratchet relay 67, following which retraction again takes place but since the ratchet relay is open microswitch 36 is not energized and the machine stops. It will be appreciated that the drill is, in effect, under the control of the drilling resistance met by it and retracts when that resistance exceeds a pre-set or pre-selected value. The expansion of the spring 33 restores the parts to starting position, pulling up the drill via slotted bracket 52 in the slot of which pin 54 is engaged. The "Electroaire" valve slide is actuated as required by solenoids forming a part of such valve. As will be seen from FIG. 4, air enters through 22 and passes through 23 to depress piston 18 in cylinder 13, return air passing through 21 and 17 and thence to the atmosphere, during "advance" of the drill. During "retract," the valve slide moves to the right closing 23 and the extension of 17 to atmosphere, opening 24 and 25 so that air then passes through 24, 17 and 21 to the underside of piston 18 and exhaust air passes through 25 to the atmosphere. Drilling thus occurs in stages or steps responsive to drilling conditions and thereby avoiding drill and equipment damage, undue stresses and jamming or breaking. The drilled hole is also clean and precise. A pantograph may be provided in known manner to drill a plurality of holes consecutively in desired locations in the workpiece.

What is claimed is:

1. An automatic drilling device comprising a mechanically responsive sensing head, a drill operatively associated with said sensing head and responsive to drilling resistance, means for advancing and retracting said sensing head to impart corresponding actuation to said drill and means for imparting continuous rotational movement to said drill, said sensing head including a cylindrical casing, a rod in said casing and projecting therebeyond into contact with said drill, a helical spring surrounding said rod within said casing and a bracket secured to said casing and extending alongside at least a part of said drill, said bracket having an elongated slot therein for the reception of a pin projecting laterally from said drill.

2. An automatic drilling device comprising a drill housing, a drill head disposed therein and provided with a counterbore, a drill having its upper end in said counterbore and splined along at least a major part of its length, means for rotating said drill in said counterbored drill head, a pin extending laterally from said drill head above said drill housing, a sensing head having an axial rod adapted to make contact with the upper surface of said drill head, a bracket secured to said sensing head and having an elongated slot in its distal end for the reception of said lateral pin, means for advancing and retracting said sensing head thereby causing advancing and retracting movements of said drill in response to the amount of resistance met by said drill during drilling and an electropneumatic or hydraulic system for actuating and controlling the advancing and retracting movements of said drill.

3. An automatic drilling device according to claim 2, in which said electropneumatic system includes a ratchet relay, a plurality of microswitches and electrical connections between said ratchet, said microswitches and said sensing head.

4. In an automatic drilling device, a mechanically responsive sensing head comprising a cylindrical housing, top and bottom end plates secured to said housing and forming therewith an enclosure, a cylindrical casing within and spaced from said cylindrical housing, a first spring-controlled rod extending down through said top plate and terminating in an enlargement which is exteriorly threaded and interiorly provided with a counterbore, said casing being threadedly engaged with the threads of said enlargement, a second spring-controlled rod having one end in the counterbore of said enlargement in spaced relationship with the bottom of the counterbore, a flange on said rod below said casing but within said enclosure, a microswitch mounted in the bottom of said casing and adapted to make contact with said flange at one side of said rod, a bracket secured to the underside of said casing on the other side of said rod and extending downwardly through an aperture provided for that purpose in said bottom plate, a drill head having a portion adapted to be contacted by the lowermost end of said rod below said enclosure and a lateral pin extending from said drill head through an elongated aperture provided in the distal end of said bracket, a plate secured to the uppermost end of said first-named rod, adjustable screws extending through said plate, circuit closing and opening microswitches adjacent said plate and screws and adapted to be closed momentarily, pneumatic-piston means for imparting movement to said plate and first rod and thence to said second rod and drill and electrical circuitry in which said sensing head and pneumatic-piston means and microswitches are connected, thereby a drill operatively associated with said sensing head is advanced and retracted in response to the amount of resistance encountered by said drill while drilling an associated workpiece.

References Cited in the file of this patent

UNITED STATES PATENTS

| | | |
|---|---|---|
| 2,030,007 | Kingsbury | Feb. 4, 1936 |
| 2,079,640 | Vickers et al. | May 11, 1937 |
| 2,433,874 | Varian | Jan. 6, 1948 |
| 2,610,528 | Kriewall | Sept. 16, 1952 |